No. 726,410. PATENTED APR. 28, 1903.
S. DIAMANT.
SPEED GEAR.
APPLICATION FILED AUG. 25, 1902.
NO MODEL.
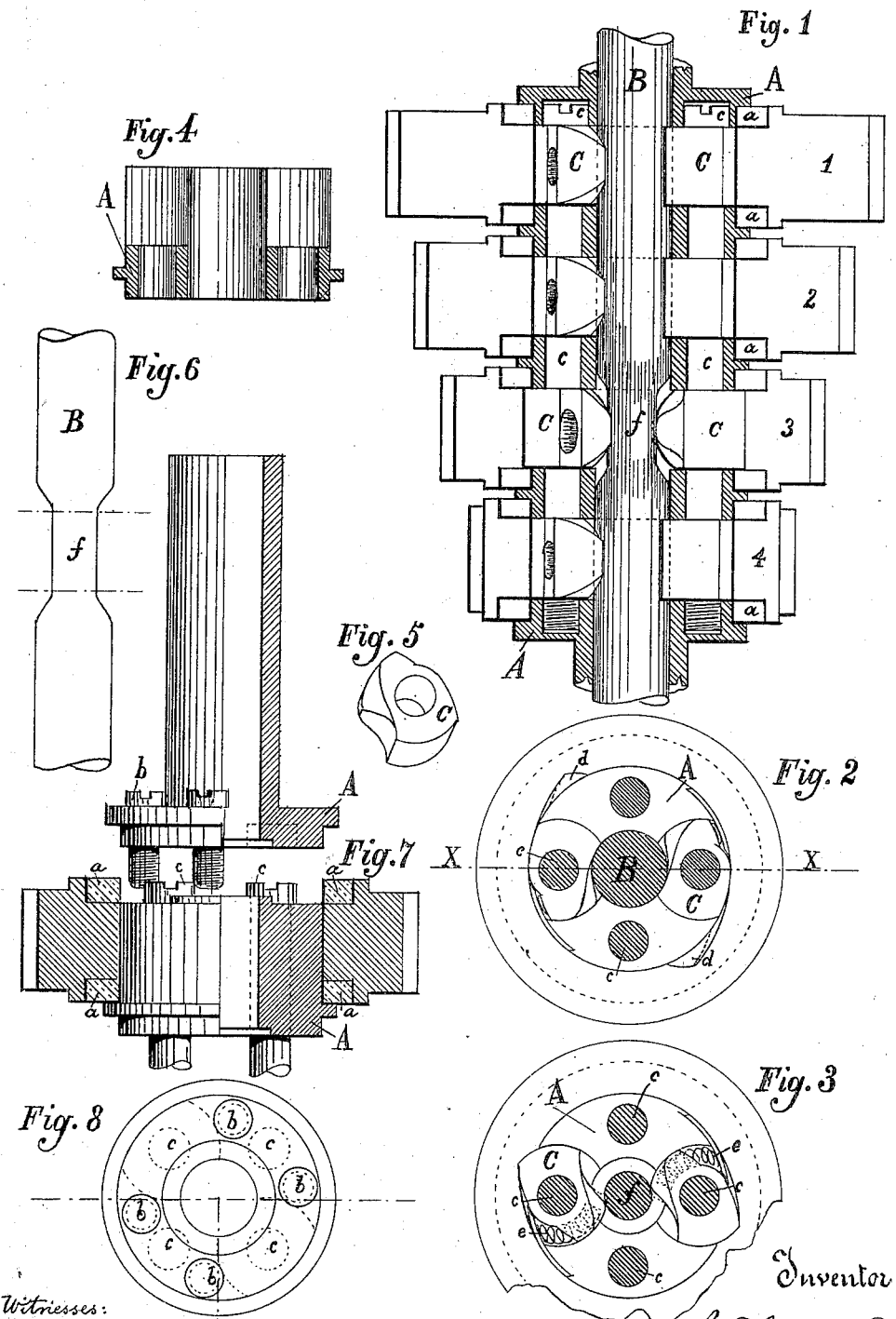

UNITED STATES PATENT OFFICE.

SIGISMONDO DIAMANT, OF LONDON, ENGLAND, ASSIGNOR OF ONE-HALF TO CARLO CROZZI, OF TRIEST, AUSTRIA-HUNGARY.

SPEED-GEAR.

SPECIFICATION forming part of Letters Patent No. 726,410, dated April 28, 1903.

Application filed August 25, 1902. Serial No. 120,946. (No model.)

*To all whom it may concern:*

Be it known that I, SIGISMONDO DIAMANT, a subject of the Emperor of Austria-Hungary, residing at London, England, have invented new and useful Improvements in Speed-Gears, of which the following is a specification.

This invention has reference to improvements in speed-gears, and more particularly in speed-gears for motor-cars, cycles, and the like; and its object is to enable any one of a series of toothed wheels, pulleys, or equivalents mounted on the driving-shaft and situated closely adjacent to each other to be readily coupled to said driving-shaft in a simple manner and by simple means and so that the coupling of any of such wheels to the driving-shaft shall be accomplished without the operator having to in any way force the coupling mechanism into its engaging position. A further advantage appertaining to my improved speed-gear is that it is a "free-wheel" gear.

My invention consists, broadly, in rotatably mounting a series of, say, toothed wheels on the driving-shaft of the motor, said shaft, which is preferably made up of a series of sections or short lengths bolted together, being tubular for a length equal to at least twice the width of the whole series of such wheels and each of the sections referred to having one or more circular holes cut endwise in it, in which I mount on the bolts which bind the sections together suitable pawls, which fit rotatably in said holes, and in providing a slidable spindle or rod which fits snugly within said shaft and has a reduced part or a groove turned in it at a suitable part, said spindle being adapted to cause the pawls to be turned into such a position that they are flush with the outside of the tubular shaft when in contact with the full diameter of the spindle and when opposite the reduced part or groove are turned by the action of a suitable spring so that they engage with notches in the boss of the relative wheel. Said wheels are of different diameters or differently geared to the driven shaft for the purpose of transmitting different speeds to the driven shaft, and in the case of toothed wheels they are preferably arranged so as to gear with a similar series in reverse order on the driven shaft.

In the accompanying drawings, in which like reference letters and numerals indicate corresponding parts throughout the several figures, Figure 1 represents a longitudinal section of a series of gear-wheels mounted on a sectional tubular shaft in accordance with my invention, the sliding spindle and the pawls being shown full. Figs. 2 and 3 are end views of one of the gear-wheels, showing, respectively, the pawls out of and in action, the bolts which carry the pawls and by means of which the sections of the tubular shaft are bolted together and the sliding spindle being shown in transverse section. Fig. 4 is a section of the tubular shaft on line X X of Fig. 2. Fig. 5 is a view in perspective of one of the pawls. Fig. 6 shows a detail of the sliding spindle. Fig. 7 shows the manner in which the various sections or lengths of the tubular shaft are bolted together and also the manner of mounting the wheels thereon; and Fig. 8 is an end view of the shaft in Fig. 7, showing the positions of the bolts.

Referring to the drawings, I mount a series of toothed wheels, pulleys, or equivalents 1 2 3 4, the number in practice being any desired, loosely and preferably on gun-metal or other suitable bearing-rings $a$ on a shaft A, which is composed or built up of sections or short lengths, as shown in Fig. 7, bolted together by bolts $b\ c$. The bosses of said wheels or pulleys are formed with notches $d$, (shown in Figs. 2 and 3,) with which the pawls, hereinafter referred to, are adapted to engage. It will be observed that the pawls do not fit exactly in the notches $d$, which would necessitate the pawls being jerked into position, but that the notches are so formed that the point of the pawl does not lose contact with the wheel when once the spring is free to act and glides into the position indicated in dotted lines in Fig. 2. The shaft A is hollow or tubular for a length equal to at least twice the width of the whole series of toothed wheels, and each of its sections excepting the end section (shown in Fig. 7) has one or more (I have shown two) circular holes cut endwise in it, through each of which one of the bolts $c$ passes centrally and in which a pawl C, one end of which is normally pressed inward by a spring $e$, is rotatably mounted on the bolt $c$.

Fitting snugly and slidably within the shaft

A, I provide a spindle B, which is formed with a reduced part or groove, as at *f*. The edges of this groove and also the edges of the pawls at their inner ends are chamfered or otherwise formed, so that the endwise movement of the spindle B will cause the spring-depressed ends of the pawls C to be easily raised out of the groove, by which action the opposite ends of such pawls will be disengaged from the notches in the relative wheel and such wheel will be disengaged or uncoupled from the driving-shaft.

In Fig. 1 I have shown the toothed wheel 3 coupled to the shaft, the sliding spindle B being in such a position that its reduced part comes immediately under the relative pawls. In this position all the other pawls are in contact with the full diameter of said spindle and are thus held out of action. When it is desired to couple any one of the other wheels, it is only necessary to slide the spindle endwise until its reduced part comes under the relative pawls of such wheel. In the intermediate positions when the reduced part of the spindle is not under any of the pawls all the wheels are free or disengaged from the shaft.

What I claim as my invention, and desire to secure by Letters Patent, is—

1. In a speed-gear, a series of toothed wheels, a hollow shaft on which said gears are mounted, a series of rotatable pawls carried by said shaft, springs to operate said pawls, notches in said toothed wheels with which said pawls may engage, and a slidable spindle within said shaft having a comparatively small part of its length reduced in diameter, all for the purposes and substantially as set forth.

2. In a speed-gear, a series of toothed wheels, a hollow shaft composed of sections bolted together on which said gears are mounted, a series of rotatable pawls carried by said shaft, springs to operate said pawls, notches in said toothed wheels with which said pawls may engage, and a slidable spindle within said shaft having a comparatively small part of its length reduced in diameter, all for the purposes and substantially as described and illustrated.

In testimony whereof I have signed my name to this specification in the presence of two subscribing witnesses.

S. DIAMANT.

Witnesses:
 HY IMRIE,
 ARTHUR CARRICK.